United States Patent [19]

Keondjian et al.

[11] 4,200,365
[45] Apr. 29, 1980

[54] DISPLAY AND REPRODUCTION OF COLOR

[75] Inventors: Hagop Keondjian, London; Stanley W. Bugbee, Watford, both of England

[73] Assignee: H. K. Productions Limited, London, England

[21] Appl. No.: 924,097

[22] Filed: Jul. 12, 1978

[30] Foreign Application Priority Data

Jul. 13, 1977 [GB] United Kingdom ............... 29468/77

[51] Int. Cl.² ...................... G03B 21/26; G03B 21/14
[52] U.S. Cl. .......................................... 353/29; 353/84
[58] Field of Search .................... 353/29, 84, 30, 31, 353/34, 37; 40/361, 367, 436, 433; 362/97

[56] References Cited

U.S. PATENT DOCUMENTS

| | | | |
|---|---|---|---|
| 2,558,660 | 6/1951 | Mullen | 353/29 |
| 3,202,813 | 8/1965 | Weinstein | 362/96 |

FOREIGN PATENT DOCUMENTS

| | | | |
|---|---|---|---|
| 570840 | 9/1958 | Belgium | 353/31 |
| 666536 | 5/1939 | Fed. Rep. of Germany | 353/31 |
| 901266 | 10/1944 | France | 353/31 |
| 841125 | 7/1960 | United Kingdom . | |
| 845154 | 8/1960 | United Kingdom . | |

*Primary Examiner*—Harry N. Haroian
*Attorney, Agent, or Firm*—Young & Thompson

[57] ABSTRACT

Color display apparatus for viewing a photographic transparency on a first screen that is illuminated by a selectively variable colored light source and a bordering screen that is illuminated by a standard white light source to provide background light. The degree of overlap of color filters in front of a single light source, or the intensity of three light sources quantify and uniquely define the amount of component light illuminating the transparency. The amount of each light component in comparison with the standard light components is displayed digitally and is also stored so that the coloring of the transparency can subsequently be reproduced.

15 Claims, 3 Drawing Figures

DISPLAY AND REPRODUCTION OF COLOR

This invention relates to the display and reproduction of colour.

The invention finds particular, though not exclusive, application in the viewing and reproduction of colour photographic transparencies.

A photographic transparency viewer is known in which a photographic "slide", usually a colour slide, is disposed on a back-bit diffused screen, and in which the colour of the illuminating light can be varied so as to vary the colouring of the slide until a desired colouring is achieved. For example, when viewed in "white" light the slide may give an impression of being too "cold" and this can be altered by introducing more red component into the back-illumination. However, with such an apparatus it is not possible consistently to reproduce the colouring of the slide on a different viewer, or at a different time, since the colour output of the light source used, usually a filament lamp, may vary from lamp to lamp and from time to time. Furthermore, it is not possible to quantify the colouring of the slide when viewed on the diffused screen so that the original slide can subsequently be reproduced with the required colouring.

It is known in the motion picture industry to alter the colouring of a cinematographic negative film by use of a selectively variably-coloured illumination light to obtain a preview of the colouring that would be obtained subsequent to photographic processing of the negative film. Such previewing apparatus is arranged to project a positive of the unaltered negative film on to two cathode-ray-tube screens and to provide for selective alteration of the colouring of one of the displayed images. The selectively variably lit image can then be altered until a desired colouring is achieved, and this can be compared with the unaltered image. However, the two cathode-ray tube screens are physically spaced apart so that the observer has to switch his line of vision from one to the other to effect comparison of the colouring of the two images. Furthermore, each screen is viewed against ambient background light which is not controlled for consistency. This previewing apparatus is very complex and expensive, and essentially is only practicable for large scale cine film use.

It is an object of the present invention to provide apparatus for viewing coloured photograhic transparencies whereby the colouring of the transparency can be selectively varied so that the required colouring can be reproduced consistently and to the same degree on different pieces of similar apparatus.

It is another object of the present invention to provide an inexpensive and simple variably lit transparency viewer for use with single photographic slides.

According to the present invention, there is provided colour display apparatus comprising first light-producing means arranged to produce light of selectively variable colour, second light-producing means arranged to produce light of a predetermined reference colour, first and second screens arranged to display light from said first and second light-producing means respectively, said second screen being arranged to provide a border to said first screen whereby comparison may be made of the colouring of said first and second screens.

The first screen may be four sided, preferably rectangular and the second screen may provide a border around three sides thereof.

Without a transparency in position the colouring of the two screens can be equalised thereby providing a standard basis for comparison of subsequent colourings. A transparency then disposed on the first screen is viewed against the constant background light of the second screen. The human eye is much more responsive to comparative colouring than to absolute colouring, since it has great difficulty in "remembering" absolute colours.

The colour display apparatus may also comprise means arranged to quantify and display information, digitally for example, representative of the intensities of each of the colour components constituting the first light producing means, for example the intensities of the red, green and blue light components. Furthermore, this information may be stored, on punched cards, punched tape, magnetic tape or any other suitable means. Conveniently, the intensity information displayed can be controlled by the means arranged to control the colour of the light of the first light-producing means.

The first light producing means may comprise one or more tungsten filament lamps and yellow, magenta and cyan filters whose degree of overlap is controllable to vary the colour produced. The first light-producing means can be considered as providing three separate colour components, blue, green, and red, which are combined together in relative intensities that are characteristic of the light of a particular colour.

The second light producing means may comprise a fluorescent gas tube.

The or each screen of the apparatus is conveniently provided by a diffuser screen arranged to be back lit by light from its associated light producing means.

The invention finds an application in the field of advertising, for example, wherein a photographic colour transparency has been made and adjustment is required of the colouring of the transparency when viewed by transmitted light. The visual impression of the transparency may be, for example, that it is too "cold", and this can be adjusted by causing the light by which the transparency is viewed to include more red light relative to the amount of green light and blue light.

In such an application, the transparency is placed on that display screen associated with the variably-coloured light, and the intensity of one or more of the colour components in the light adjsuted until the required colouring of the transparency is achieved. The provision of a display of a reference colour, preferably from a 5,000° K. standard white light source, as a background against which the variable colour is viewed, allows an accurate impression of the true colouring of the transparency to be obtained.

The apparatus can be set to a reference level, before use with a transparency for example, by adjusting the output of the first screen to match that on the second screen. Where the intensity information is displayed digitally, this can then conveniently be set manually to zero. Subsequent adjustment of the output of the first light producing means is then effective to change, in a positive or negative sense, the intensity values displayed, thus giving a unique representation of the colour produced. These settings may be reproduced on the same apparatus at a later time, or on a similar apparatus, possibly located far away, after the initial setting of the reference intensities, and the exact colouring can then be reproduced.

The colour display apparatus can thus allow changes in colouring of a transparency to be made and observed relatively simply and conveniently, and also provides for quantification of the relative intensity of the colour components of the exposing light source, whereby that colouring can be reproduced remotely.

Colour display apparatus in accordance with the present invention, will now be described, by way of example, with reference to the accompanying drawings, in which.

Figure 1:
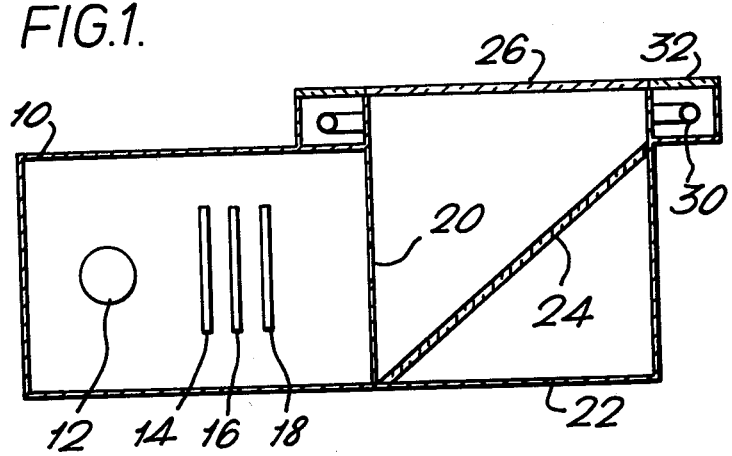
FIG. 1 is a schematic vertical section through one embodiment of the apparatus.
Figure 2:
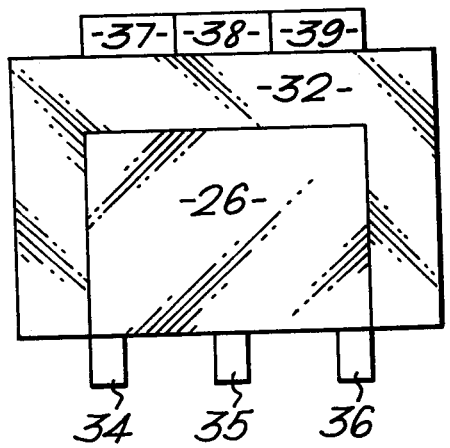
FIG. 2 is a plan view of the apparatus shown in FIG. 1.

Referring to FIGS. 1 and 2 of the drawings, the apparatus comprises a housing 10 in which is mounted a tungsten filament lamp 12 which is arranged by suitable optical means, not shown, to project its light through one or more of three colour filters 14,16,18. The filters are preferably dichroic filters, which have good fade and heat resistant properties, are semi-circular in shape and are respectively yellow, magenta and cyan. The light from the lamp 12 is then arranged to pass through an aperture 20 in the wall of the housing 10 and into a further housing 22 in which a matt white reflector 24 is disposed at 45° to the light path, so as to reflect the light upwards on to a diffuser screen 26. The reflector 24, its housing 22 and the diffuser screen 26 are arranged such that a homogenous colour is seen on the screen 26 when viewed from outside the apparatus.

A fluorescent light tube 30 extends around the housing 22 and is arranged to project its light onto a second diffuser screen 32, which surrounds the first screen 26 on three sides (FIG. 2).

The angular positions of the filters 14,16,18, i.e. the extent to which they intercept the light path between the lamp 12 and the aperture 20, are controlled by respective knobs 34,35 and 36 on the housing 22, so that the knobs 34, 35 and 36 control the colour of the light appearing on the first diffuser screen 26. The control knobs are linked to corresponding digital display panels 37, 38 and 39, which display values corresponding to the filter positions, and which thereby uniquely identify the colour on the screen 26.

The fluorescent tube 30 is arranged to provide the standard 5,000° K. white light, and since its diffuser screen 32 is in direct adjacency with the diffuser screen 26, it serves as a reference background to the colour produced by the lamp 12 in combination with the filters 14, 16 and 18.

The combination of the three coloured filters 14, 16 and 18 with the essentially white light produced by the lamp 12 is such that with only the magenta and cyan discs 16 and 18 intersecting the light path, the colour displayed on the screen 26 is blue, with only the yellow and cyan filter discs 14 and 18 intersecting the light path the colour displayed is green, and only the yellow and the magenta filters 14 and 16 intersecting the path the colour displayed on the screen 26 is red. By varying the degree of overlap of the three filters any colour can be displayed on the screen 26.

When, in use, a positive photographic transparency is placed on the screen 26, it can be viewed under light of a selected colour against a constant reference background colour.

The operation of the apparatus of FIGS. 1 and 2 with a colour transparency will now be described. Before the transparency is put in place on the screen 26, the control knobs 34, 35 and 36 are adjusted so as to bring the colour of the screen 26 into agreement with the colour on the reference screen 32. The values indicated by the display panels 37, 38 and 39 are then set manually to zero, since equal intensities of blue, green and red light are then being directed on to the screen 26. The transparency is then placed on the screen 26, and the control knobs 34, 35 and 36 adjusted so as to produce the desired colouring of the transparency. The values consequently indicated by the display panels 37, 38 and 39 uniquely correspond to the colour produced on the diffuser screen 26, and this information may also be arranged at the same time to be produced on a printed or punched card or punched tape. The characterising values, together with a particular transparency may thus be used on the same apparatus at a different time, to reproduce the exact colouring of the transparency.

It will be appreciated that the apparatus of FIGS. 1 and 2 is arranged to illuminate a transparency by transmitted light such that the size of the image seen is the size of the transparency itself. Whilst this is usually quite satisfactory for large format film sizes, it does have disadvantages when the film is of 35 m.m. or even 6×6 cm. In such cases the image seen on the transparency itself may be too small to be useful in determining the best colouring. This difficulty can be overcome by apparatus in accordance with the present invention in which the first light-producing means comprises an enlarger lens. The light can then be conveniently arranged to pass through an enlarging lens, after transmission through the transparency, for onward transmission to a viewing screen flanked, in the manner already described, by a reference screen. To this end the apparatus of FIGS. 1 and 2 may be modified so as to locate the transparency and enlarging lens in the light path beyond the mirror 24, to replace the diffuser screen 26 by a back-projection screen—this screen and the reference screen 32 being relocated further away from the mirror 24 is necessary.

Figure 3:
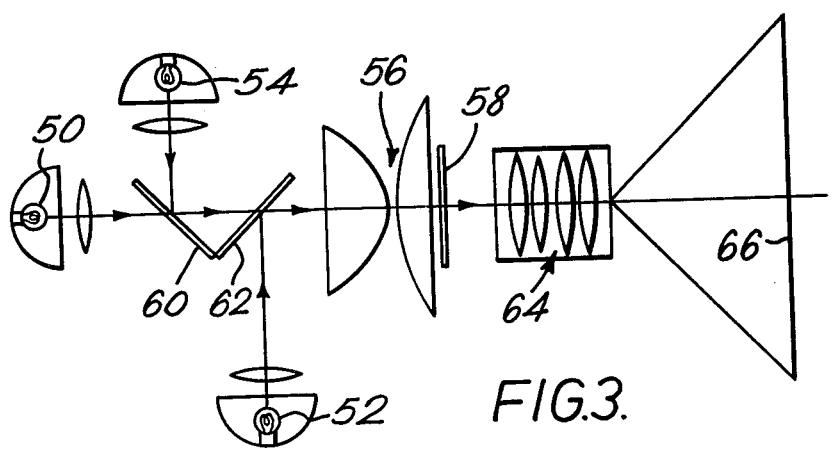
FIG. 3 is a schematic representation of the first light-producing means of a further embodiment of the apparatus.

Alternatively, the light-producing means shown in FIG. 3 can be used to provide the light of variable colour.

Referring to FIG. 3, light from three identical tungsten lamps 50, 52, 54 is arranged to pass through a condenser lens arrangement 56 for transmission through a photographic transparency located in a mount 58. The light from the lamps reaches the condenser via two beam-splitting dichroic mirrors 60, 62 mounted at right angles to each other and at 45° to the light path from each lamp, such that the lamps 50, 52 and 54 are responsible for light of blue, green and red colour respectively falling on the condenser lens arrangement 56.

After transmission through the transparency in its mount 58, the coloured light is incident on a multi-element projection lens 64 for projection on to a back-projection screen 66. Preferably the lens 64 is a zoom lens. It is to be understood that the screen 66 will in practice be surrounded by a white light reference screen in the manner of the reference screen 32 surrounding the screen 26 of the apparatus of FIGS. 1 and 2.

The colouring of the image of the transparency projected on to the lens 64 is controlled by varying the brightnesses of the lamps 50, 52 and 54. The control system of the apparatus of the first embodiment of the invention, and described in particular with reference to FIG. 2, is also employed in apparatus embodying the light-producing means of FIG. 3.

It should be noted that the use of dichroic mirrors 60, 62 so arranged is not restricted to the particular optical arrangement of FIG. 3. They may also be used, for example, in place of the fitlers 14, 16 and 18 of the apparatus of FIGS. 1 and 2, with suitable modification of the reminder of the optical system.

If the lens 64 of FIG. 3 is a zoom lens, a selected portion of the transparency may be enlarged to the full size of the screen 66.

The characterising values on the transparency may be conveyed, not necessarily at the same time or by the same means, to a different apparatus for further display of the same colouring of the transparency. To effect the further display, either on the same or on a similar apparatus, the colour projected on the screen 26 or 66 is again brought into agreement with that on the reference screen 32 and the digital display panels 37, 38 and 39 manually set to zero. The control knobs 34, 35 and 36 are then operated so as to produce the characterising values on their respective displays. The colouring of the transparency will then correspond to that of the original colouring. It should be noted in this respect, that it is not essential that the same reference colour be used in both cases, since the human eye is much more sensitive to comparative rather than absolute colour. This is to say, provided the intensity differences between the reference, i.e. zero, values and the characterising values remain the same, then even if fairly large differences in the reference colour occurs at different location and/or time, the eye will still have the impression that the colouring of the transparency is the same in both cases.

The three numbers indicated by the intensity-value display panels 37, 38 and 39 can always be arranged to include one zero value, by subtracting from each number the lowest of the three indicated values. The optical effect of this is merely a reduction in the overall intensity of light on the screen 26, without any change in the relative intensities of the three colours. A reduction in the overall intensity is often useful, in any event, to facilitate consideration of the relative intensities, and thus colours, of the three component colours. In practice, therefore, the colouring of a transparency placed on the screen 26 can be defined by two intensity values, and sometimes by a single value. The amount of information that has to be stored or transmitted is thus minimised.

It will be appreciated that each control knob 34, 35, and 36 has two extreme positions for varying the colour produced on the screen 26 or 66. With reference to FIGS. 1 and 2, one extreme corresponds to a complete interruption of the light path from the lamp 12 by the corresponding filter, and the other extreme corresponds to a position wherein no part of the filter overlaps the light path. With reference to FIG. 3, the extreme positions correspond to the maximum and minimum useful operating brightness of the corresponding lamp. Thus it may be found that on rotation of at least one of the control knobs the desired colouring cannot be achieved because its directly-associated filter or lamp has reached one of its extreme positions. In this case, further adjustment of one or both of the other control knobs has also to be effected so as to achieve the desired colouring. The apparatus may, alternatively, be arranged so as automatically to vary the position one or two of the lamps, when a third approaches its extreme positions.

Although the filters 14, 16, 18 have been described as dichroic filters, in arrangements wherein the heat resistant properties are not required then other types, for example gelatine filters, may be used.

It has been found that a single lamp 12 gives sufficient light for most applications, but it is envisaged that two or more lamps may be employed if greater intensity is required. The light source represented by the lamp 12 may alternatively be provided by other suitable means.

The values indicated by the display panels 37, 38 and 39 characterising a particular colouring of a particular transparency may also be used to set up a photographic enlarger so as to produce further transparencies or prints having the desired colouring. The enlarger may be provided with display panels and control knobs functioning in a way similar to the panels 37, 38, 39 and knobs 34, 35, 36 of the colour display apparatus of the invention so as to control the colour of the light source of the enlarger. A suitable enlarger is that having the MR 2000 Digital Colour Head manufactured and sold by the applicants.

Photosenstive paper of different grades and from different manufacturers has different colouring properties, and the enlarger may be modified by the addition of a selector circuit and operating switch having positions corresponding to different papers so as to relate the characterising intensity values to the particular film material used.

The display apparatus can advantageously be provided with a comparison feature, whereby depression of a button, for example, is arranged to return the colouring of the coloured screen to its reference value (i.e. into agreement with the reference screen) so that the change of colouring brought about by operation of the colour controls on the inner screen can easily be observed.

It is evident that those skilled in the art may make numerous modifications of the specific embodiments described above without departing from the present inventive concepts. It is accordingly intended that the invention shall be construed as embracing each and every novel feature and novel combination of features present in or possessed by the apparatus herein described and that the foregoing disclosure shall be read as illustrative and not as limiting except to the extent set forth in the claims appended hereto.

We claim:

1. Color display apparatus comprising first light producing means to produce light of variable color, second light producing means to produce light of a predetermined reference color, first and second screens to display light from said first and second light producing means respectively, said second screen providing a border to said first screen, means selectively to vary the color of the light produced by said first light producing means, and means to provide a representation of the intensity of component colors of the light produced by said first light producing means, whereby the color of the light produced by said first light producing means is uniquely defined.

2. Colour display apparatus according to claim 1, wherein said first screen is of quadrilateral shape and said second screen borders three sides thereof.

3. Colour display apparatus according to claim 1, wherein said first screen is substantially rectangular.

4. Color display apparatus according to claim 1, wherein said representation means comprises three display means to provide a digital display of values representative of the blue, red and green components respectively of the light produced by said light producing means.

5. Color display apparatus according to claim 4, wherein said first light producing means comprises a light source to produce white light, and wherein said color varying means comprises a respective manual control member and color filter associated with said three display means, said control members varying the degree of overlap between their associated filters and said light source, and said associated digital display means displaying a representation of the angular orientation of said filters.

6. Colour display apparatus according to claim 5, wherein said light source comprises a tungsten filament lamp.

7. Color display apparatus according to claim 4, wherein said first light producing means comprises three white light sources and two dichroic mirrors, each mirror reflecting light from one of said light sources and transmitting light from another of said light sources along an optical path to said first screen, and wherein said color varying means comprises a respective manual control member for each light source to vary the intensity of the light output thereof, thereby to vary the color of the light transmitted from said first light producing means.

8. Color display apparatus according to claim 1, comprising means to store said representation of the intensity of said component colors, so that the unique color defined thereby may subsequently be reproduced by said first light producing means.

9. Colour display apparatus according to claim 8, wherein said store means comprises a punched card.

10. Colour display apparatus according to claim 8, wherein said store means comprises a punched tape.

11. Colour display apparatus according to claim 8, wherein said store means comprises a magnetic tape.

12. Colour display apparatus according to claim 1, wherein said second light-producing means comprises gas discharge tube.

13. Colour display apparatus according to claim 1, wherein said second light-producing means provides 5000° K. white light.

14. Colour display apparatus according to claim 1, wherein said first and second screens each comprises a diffuser screen.

15. Color display apparatus comprising first light producing means comprising at least one white light source and filter means mounted along an optical path extending therefrom; a first diffuser screen to receive on one side light from said first light producing means along said optical path, and to receive on the other side thereof a photographic transparency to be illuminated by said light; a standard white light source to produce light of a predetermined color; a second diffuser screen to receive light from said standard white light source; said second screen being disposed closely adjacent said first screen to provide a background border thereto against which said photographic transparency disposed on said first screen is viewed; three manual control members to vary the intensity of respective components of the color of the light produced by said first light producing means, said three components uniquely defining the color of said light; and three digital display means to display representations of the intensity of said three color components, as a function of the settings of the manual control members, respectively.

* * * * *